United States Patent
Hubel et al.

(10) Patent No.: US 10,771,697 B2
(45) Date of Patent: Sep. 8, 2020

(54) STILL IMAGE STABILIZATION/OPTICAL IMAGE STABILIZATION SYNCHRONIZATION IN MULTI-CAMERA IMAGE CAPTURE

(71) Applicant: Apple Inc., Cupertino, CA (US)

(72) Inventors: Paul M. Hubel, Mountain View, CA (US); Marius Tico, Mountain View, CA (US); Ting Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/696,583

(22) Filed: Sep. 6, 2017

(65) Prior Publication Data

US 2018/0070015 A1 Mar. 8, 2018

Related U.S. Application Data

(60) Provisional application No. 62/383,992, filed on Sep. 6, 2016.

(51) Int. Cl.
*H04N 5/232* (2006.01)
*H04N 5/235* (2006.01)
(Continued)

(52) U.S. Cl.
CPC ......... *H04N 5/23267* (2013.01); *G06T 5/002* (2013.01); *G06T 5/50* (2013.01);
(Continued)

(58) Field of Classification Search
None
See application file for complete search history.

(56) References Cited

U.S. PATENT DOCUMENTS

| 10,165,194 | B1 * | 12/2018 | Baldwin | ............ H04N 5/2355 |
| 2007/0098386 | A1 * | 5/2007 | Yoneda | ................ H04N 5/232 |
| | | | | 396/60 |

(Continued)

FOREIGN PATENT DOCUMENTS

| EP | 2549763 A2 * | 1/2013 | .......... H04N 5/2258 |
| EP | 2549763 A2 | 1/2013 | |
| WO | WO 2013/190171 A1 | 12/2013 | |

OTHER PUBLICATIONS

International Patent Application No. PCT/US2017/050186; Int'l Preliminary Report on Patentability; dated Mar. 21, 2019; 7 pages.

(Continued)

*Primary Examiner* — Kevin Ky
(74) *Attorney, Agent, or Firm* — BakerHostetler

(57) ABSTRACT

Techniques are disclosed for managing image capture and processing in a multi-camera imaging system. In such a system, a pair of cameras each may output a sequence of frames representing captured image data. The cameras' output may be synchronized to each other to cause synchronism in the image capture operations of the cameras. The system may assess image quality of frames output from the cameras and, based on the image quality, designate a pair of the frames to serve as a "reference frame pair." Thus, one frame from the first camera and a paired frame from the second camera will be designated as the reference frame pair. The system may adjust each reference frame in the pair using other frames from their respective cameras. The reference frames also may be processed by other operations within the system, such as image fusion.

35 Claims, 6 Drawing Sheets

(51) Int. Cl.
  *G06T 5/00* (2006.01)
  *G06T 5/50* (2006.01)
  *G06T 7/00* (2017.01)
  *H04N 5/225* (2006.01)

(52) U.S. Cl.
  CPC ......... *G06T 7/0002* (2013.01); *H04N 5/2355* (2013.01); *H04N 5/23229* (2013.01); *H04N 5/23232* (2013.01); *H04N 5/23254* (2013.01); *H04N 5/23258* (2013.01); *G06T 2207/10144* (2013.01); *G06T 2207/20221* (2013.01); *H04N 5/2258* (2013.01); *H04N 5/2351* (2013.01)

(56) References Cited

U.S. PATENT DOCUMENTS

| | | | |
|---|---|---|---|
| 2008/0284872 A1* | 11/2008 | Asoma | H04N 5/235 348/229.1 |
| 2009/0052776 A1* | 2/2009 | Panahpour Tehrani | H04N 9/68 382/167 |
| 2011/0096169 A1* | 4/2011 | Yu | H04N 7/181 348/159 |
| 2013/0071041 A1* | 3/2013 | Jin | G06T 3/4053 382/254 |
| 2013/0235223 A1 | 9/2013 | Park et al. | |
| 2014/0232904 A1 | 8/2014 | Na et al. | |
| 2014/0320608 A1* | 10/2014 | Muukki | G06F 13/4282 348/47 |
| 2015/0138314 A1* | 5/2015 | Vincent | H04N 5/23238 348/38 |
| 2016/0037093 A1* | 2/2016 | Mandelli | H04N 5/374 348/296 |
| 2016/0173768 A1* | 6/2016 | Campbell | G06T 3/4015 348/222.1 |
| 2016/0350904 A1* | 12/2016 | Zhang | G06T 7/593 |
| 2017/0034434 A1* | 2/2017 | Zhang | H04N 9/045 |
| 2017/0109867 A1* | 4/2017 | Milshteyn | G06T 5/50 |
| 2017/0163966 A1* | 6/2017 | Barron | H04N 13/271 |
| 2018/0089807 A1* | 3/2018 | Reusch | G06T 5/002 |
| 2019/0051036 A1* | 2/2019 | Matsunobu | G06T 15/205 |

OTHER PUBLICATIONS

International Patent Application No. PCT/US2017/050186; Int'l Search Report and the Written Opinion; dated Dec. 6, 2017; 13 pages.

* cited by examiner

100

200

300

400

500

600

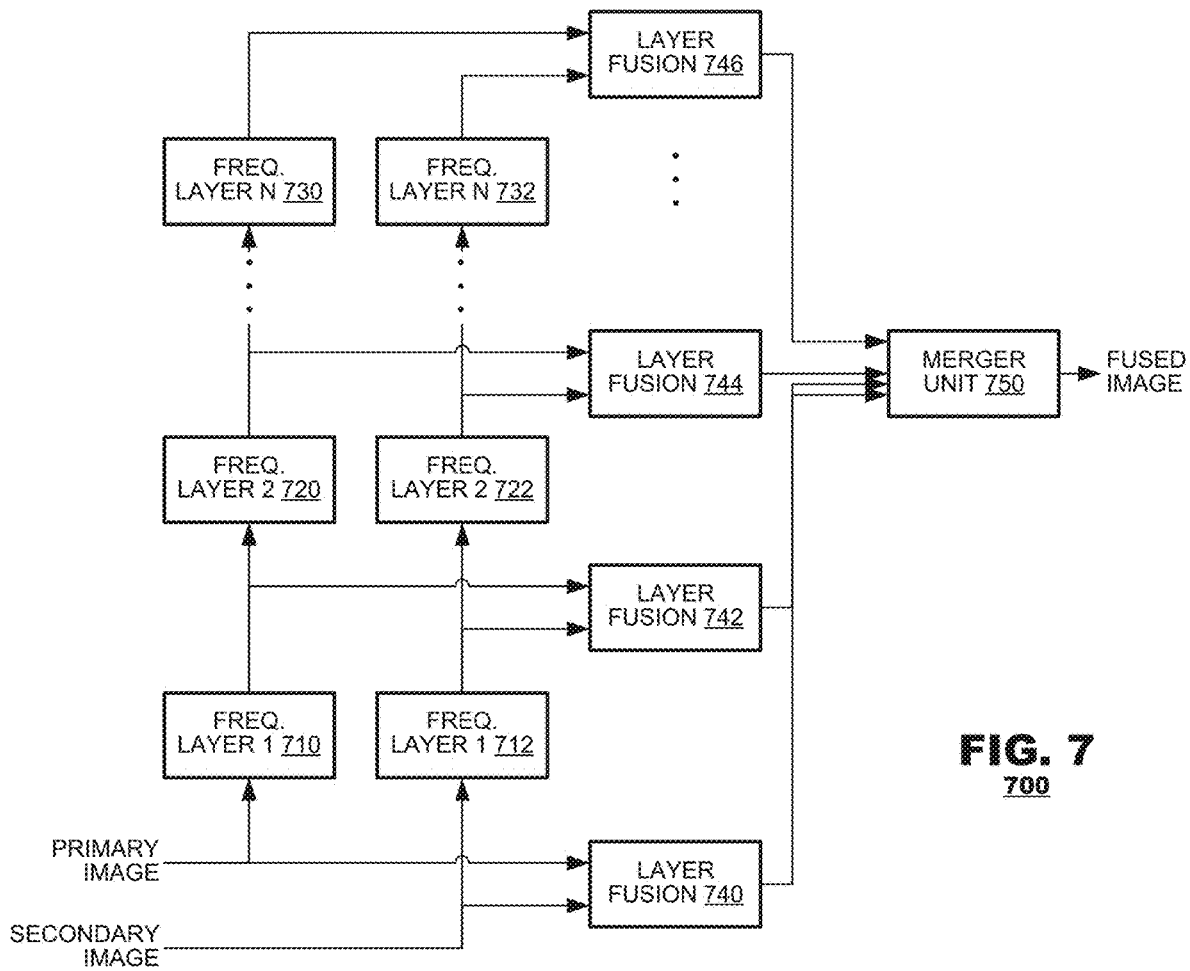
FIG. 7
700
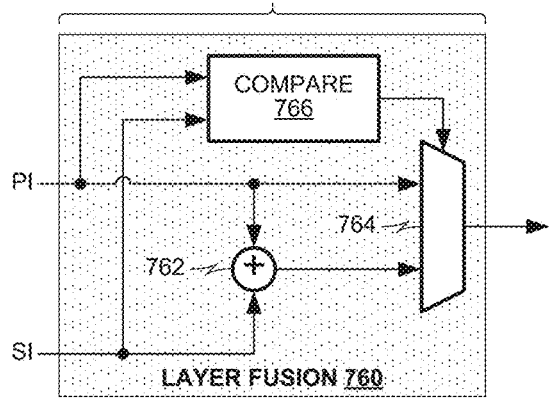

800

STILL IMAGE STABILIZATION/OPTICAL
IMAGE STABILIZATION
SYNCHRONIZATION IN MULTI-CAMERA
IMAGE CAPTURE

CLAIM FOR PRIORITY

The present application benefits from priority of U.S. Application No. 62/383,992, filed on Sep. 6, 2016 and entitled "Still Image Stabilization/Optical Image Stabilization Synchronization in Multi-Camera Image Capture," the disclosure of which is incorporated herein by reference in its entirety.

BACKGROUND

The present disclosure relates to image processing techniques for use in camera systems and, in particular, multi-camera systems.

Multi-camera systems are finding application in a variety of imaging applications. For example, some multi-camera systems find use in stereoscopic imaging applications, which support 3D imaging. Other multi-camera systems find use for other imaging applications, where, for example, a first camera captures an image in a relatively wide field of view and a second camera captures the same image in a narrower, zoomed field of view. In either case, the images captured by the multi-camera systems typically are used by other processes. It is desirable that the images output by the multi-camera system have the highest image quality possible.

There is a need for a synchronized image capture and processing protocol to improve image quality in the output of multi-camera imaging systems.

BRIEF DESCRIPTION OF THE DRAWINGS

FIG. 7 illustrates a fusion unit according to an embodiment of the present disclosure.

DETAILED DESCRIPTION

Embodiments of the present disclosure provide techniques for managing image capture and processing in a multi-camera imaging system. In such a system, a pair of cameras each may output a sequence of frames representing captured image data. The cameras' output may be synchronized to each other to cause synchronism in the image capture operations of the cameras. The system may assess image quality of frames output from the cameras and, based on the image quality, designate a pair of the frames to serve as a "reference frame pair." Thus, one frame from the first camera and a paired frame from the second camera will be designated as the reference frame pair. The system may adjust each reference frame in the pair using other frames from their respective cameras. The reference frames also may be processed by other operations within the system, such as image fusion.

Figure 1:
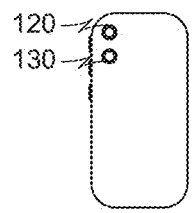
FIG. 1 is a functional block diagram of an image capture system according to an embodiment of the present disclosure.
Figure 1:
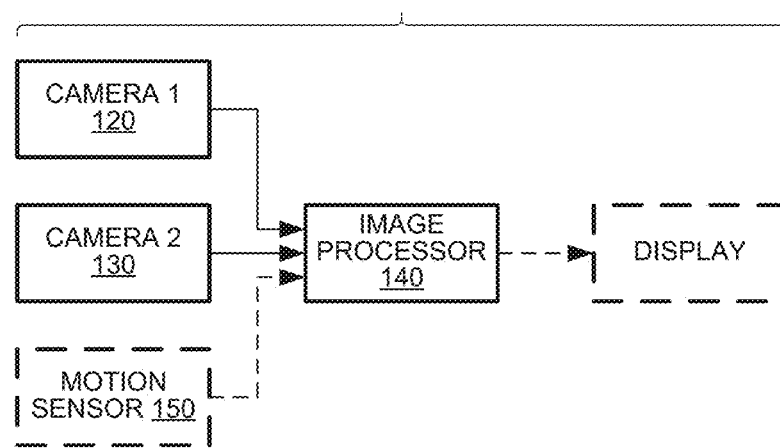

FIG. 1 is a functional block diagram of an image capture system 100 according to an embodiment of the present disclosure. The system 100 may include a pair of cameras 120, 130 and an image processor 140. The cameras 120, 130 each may capture image data representing a local environment and output the captured image data to the image sensor 140 as a sequence of frames. The image sensor 140 may perform processing operations on the frames output from the cameras 120, 130, discussed herein, to improve their image quality.

The cameras 120, 130 may have different image capture characteristics from each other by, for example, having different numbers of pixels, different zoom characteristics, and/or different focal lengths. For example, in one implementation, both cameras 120, 130 may have fixed optical systems (predetermined lens types, fixed focal lengths, etc.) that are different from each other. In another implementation, one (or both) of the cameras 120, 130 may accommodate different lenses, may operate according to variable focus positions, and/or may permit selection of variable optical filters during operation; again, the optical characteristics of the cameras 120, 130 may be different from each other, either in design or in selection of operational settings.

Image capture operations of the cameras 120, 130 also may operate according to variable operational settings, which may cause them either to be the same or different from each other. The cameras 120, 130 may include image sensors that convert incident light to electrical signals. The cameras' image sensors may differ from each other, as noted, by the number of pixel circuits provided for each. The image sensors also may operate according to operational parameters that, for example, determine the exposure times of the images generated respectively by the sensors and other operational modes (pixel binning) that determine the number of pixel values to be generated by the cameras' sensors. Again, in some operations, the operational settings for the cameras 120, 130 may be selected to be different from each other.

As indicated, the cameras 120, 130 may operate in a synchronized fashion. In one embodiment, synchronization may cause the cameras 120, 130 to generate frames at a predetermined frame rate (e.g., 60 frames/sec., 30 frames/sec.) notwithstanding operational settings differences between the cameras 120, 130. In one embodiment, the cameras 120, 130 may be controlled so that the exposure operations for each frame from one camera (say, camera 120) that is to be paired with a frame from the other camera 130 at least partially overlap. For example, if a first camera 120 generates frames with exposure times that are longer than the exposure times for paired frames from the second camera 130, it may be advantageous to control exposure timing to cause the exposure times of the second camera 130 to be contained entirely within the exposure times of the paired frames from the first camera 120. It may be advantageous to control exposure timing to cause predetermined events in each camera's exposures (e.g., the starting times of exposure, midpoints of exposure, or end times of exposure) temporally coincide. The cameras 120, 130 may operate according to variable exposure times, which may render it impractical to cause predetermined events to coincide on every exposure; in such cases, it may be sufficient to cause the exposures of the two cameras 120, 130 at least to partially overlap for paired frames.

In some variations, the cameras 120, 130 may be mounted within a device 110 in a manner so the cameras have fields of view that are generally aligned with each other such that the fields of the first and second cameras at least partially overlap but, owing to their different characteristics, not identical to each other.

The image processor 140 may control certain operations of the cameras 120, 130. For example, the image processor 140 may control timing of image capture operations by the cameras or it may control exposure times of pixels within the cameras 120, 130. The image processor 140 also may control timing of read operations. Thus, the image sensor 140 may read frame data from the cameras 120, 130 at times that it dictates to the cameras 120, 130.

In an embodiment, the cameras 120, 130 and image processor 140 may be provided within a processing device 110, such as a smartphone, a tablet computer, a laptop computer, a desktop computer, a portable media player or the like.

Figure 2:
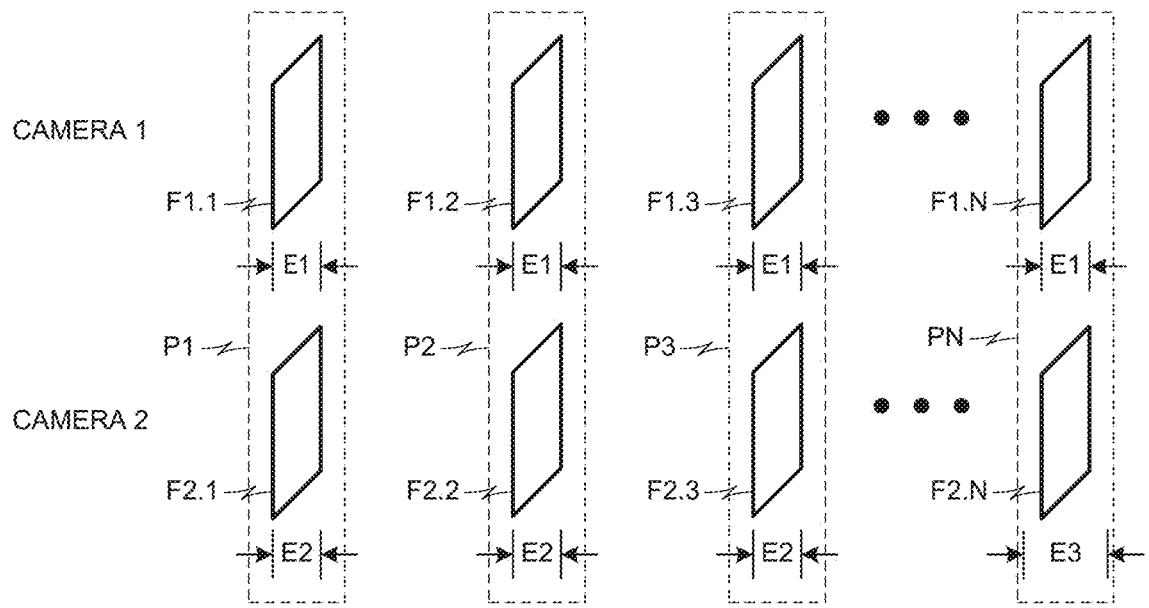
FIG. 2 illustrates an exemplary set of image data that may be generated by the system of FIG. 1.

FIG. 2 illustrates an exemplary set of image data that may be transferred from the cameras to the image processor. As illustrated, a first camera may output a first sequence of frames F1.1-F1.N to the processor and a second camera may output a second sequence of frames F2.1-F2.N. Image capture operations may be controlled to synchronize timing of images captured by the two cameras as closely as possible within limitations imposed by the cameras' hardware and the image capture settings that the image processor selects. As noted, the cameras 120, 130 may operate according to exposure settings that may cause frames' exposure times either to be the same or to be different between the cameras.

In the example of FIG. 2, the frames F1.1-F1.N output by the first camera are shown as being captured using a common pixel exposure setting E1. FIG. 2 also illustrates that the frames F2.1-F2.N output by the second camera are captured using a variable exposure setting—frames F2.1-F2.3 are captured using an exposure setting E2 while frame F2.N is captured using an exposure setting E3. In this example, the image processor 140 may coordinate timing of the image capture settings so the pixel exposure operations in the two cameras at least partially overlap notwithstanding differences in the duration of the pixel exposure operations.

Figure 3:
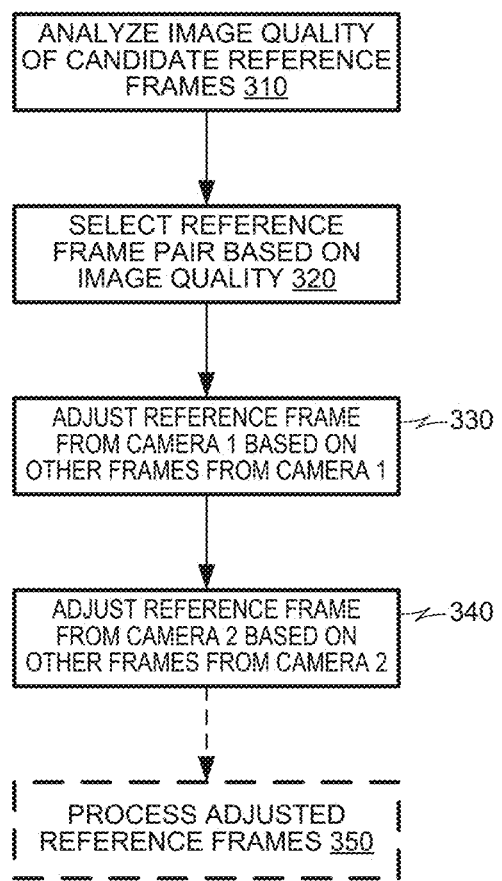
FIG. 3 illustrates a method according to an embodiment of the present disclosure.

As illustrated in FIG. 2, the cameras 1 and 2 may output frames to the image sensor in paired relationships based on the timing of the frames' capture. Frames F1.1 and F2.1 are paired together (shown as P1), frames F1.2 and F2.2 are paired together as pair P2, etc., based on their exposure times In an embodiment, an image processor may perform image-processing operations on frame data output from a pair of cameras to derive an aggregate image having improved image quality as compared to the images output from either of the cameras by themselves. FIG. 3 illustrates a method 300 that may be performed by an image processor according to the embodiment.

The method 300 may assess image quality of frames output from the cameras (box 310) and, based on the image quality, designate a pair of the frames to serve as a "reference frame pair" (box 320). Thus, one frame from the first camera (say, frame F1.2 in FIG. 2) and a counterpart frame F2.2 from the second camera will be designated as the reference frame pair. The method 300 may adjust content of the reference frame F1.2 from the first camera using other frames F1.1, F1.3-F1.N output by the first camera (box 330). The method also may adjust content of the reference frame F2.2 from the second camera using other frames F2.1, F2.3, F2.N output by the second camera (box 340). Optionally, the method 300 may merge the denoised reference frames together to form a final frame (box 350).

Identification of reference frames may occur in a variety of ways. In a first embodiment, the method 300 may assess image quality of both frames F1.1 F2.1, F1.2, F2.2, etc. in each pair P1, P2, etc. and may select the pair (say P2) of frames having the highest overall image quality. A metric may be developed for a target image quality to be achieved, and the quality of the frames from each camera may be compared against the target image quality value. The metric may be based in measurable characteristics of image content, for example, image sharpness, image brightness, dynamic range of image content, etc., from which estimates of each frame output by the cameras 120, 130 (FIG. 1) may be generated. The quality values of the frames output by each camera may be weighted equally for such purposes or may be assigned weights that more heavily weight frames output from one camera (say, camera 120) over frames from the other camera 130. In one embodiment, quality assessments may be made based solely on output from a single one of the cameras 120. Additionally or alternatively, the quality of the frames from the first camera may be used to make a preliminary selection of frames that will be candidate reference frame pairs (e.g., only frames from the first camera meeting a first quality threshold, or a predetermined number of frames from the first camera within a period of time having highest estimated quality), and then the quality of the second camera's frames may be used to select a reference frame pair from among the candidate frames.

In another embodiment, the method 300 may assess image quality from a set of frames output by a single camera that is designated by operational parameters in which the system operates. For example, in a system having a pair of cameras with different zoom properties (e.g., a wide angle camera and a telephoto camera), operator zoom controls may cause the output of one of the cameras to be designated. An operator zoom operation that selects close in image content for image capture may cause the telephoto camera to be designated. By contrast, an operator zoom operation that selects a wide field of view for image capture may cause the wide angle camera to be designated. In such an embodiment, when one of the cameras is designated, the image quality assessment may be derived from the frames output by the designated camera.

Image quality assessment may be performed from sharpness data that is output by one or more of the cameras that indicate sharpness of content in each frame. In such an embodiment, the cameras may perform image stabilization assessments that indicate a degree of sharpness in each frame. Frames having relatively higher sharpness scores may be considered to have higher quality than other frames having relatively lower sharpness scores. The cameras may output metadata to the image processor that identify the sharpness scores of the respective frames.

In another embodiment, image quality assessment may be performed from an analysis of image content of each frame. An image processor 140 may evaluate characteristics of the frames output from the cameras, for example, by the frames' relative sharpness, exposure conditions and/or image content. For example, frames having relatively higher sharpness scores may be considered to have higher quality than other frames having relatively lower sharpness. As another example, exposure data may provide an indication how well a candidate image captures the dynamic range of a scene (i.e. a very bright image may be saturated in many areas of an image, whereas a very dark image removes the details in the shadows); an image histogram may indicate how well the current image is exposed. Alternatively, when coupled with face detection, frames identified as having faces in which eyes are determined to be open (e.g., not blinking) or in which faces are determined to be smiling may be identifies as having higher quality than other frames in which these conditions do not appear. The image quality may be estimated based on a single factor or a weighted combination of a plurality of these factors.

In a further embodiment, image quality assessment may be performed from an analysis of data from sources outside the camera. For example, image quality may be assessed from data of a motion sensor 150 (FIG. 1) provided in a common device 100 with the cameras 120, 130. Data from the motion sensor 150 may indicate, for example, a degree of motion that occurs during capture of each of the frames F1.1-F1.N, F2.1-F2.N, which may indicate an amount of motion blur that likely is present in each frame's image content. Images that are captured during times of low motion may be designated as having relatively higher image quality than images that are captured during times of low motion. Image quality may be assessed based on data from a light sensor, which may indicate a type of ambient light (e.g., natural light, artificial light) that is present during image capture.

Additionally, image quality assessment may be performed to disqualify certain frames output based on image capture characteristics. As discussed, image capture may be performed with different exposure settings. In some applications, individual frames may have long exposure times, for example ¼ of a second or longer. Such frames typically exhibit good signal to noise characteristics for image content that does not move but they also exhibit heavy blur artifacts for moving image content. Such techniques may be performed with cameras that perform optical image stabilization in which frames are generated according to alternating frame exposure times, such as a "short," "short," "long" exposure cadence. Frames captured according to the long exposure times may be disqualified from serving as reference frames. Alternatively, the system may disqualify frame pairs from serving as reference frames when exposure times of either frame in a pair exceeds a threshold amount of time. In another embodiment, the system may prioritize some frame pairs over others based on, for example, differences in exposure times among the frames in each pair. In one embodiment, when candidate frame pairs are generated with variable exposure times—some where the frames in each pair have similar exposure times and others where the frames in each pair have different exposure times from each other—the system may prioritize the candidate pairs for selection with similar exposure times.

The principles of the present disclosure find application with cameras that perform high dynamic range (colloquially, "HDR") image capture techniques, in which a frame sequence is captured according to a pattern of variable exposure times.

Figure 4:
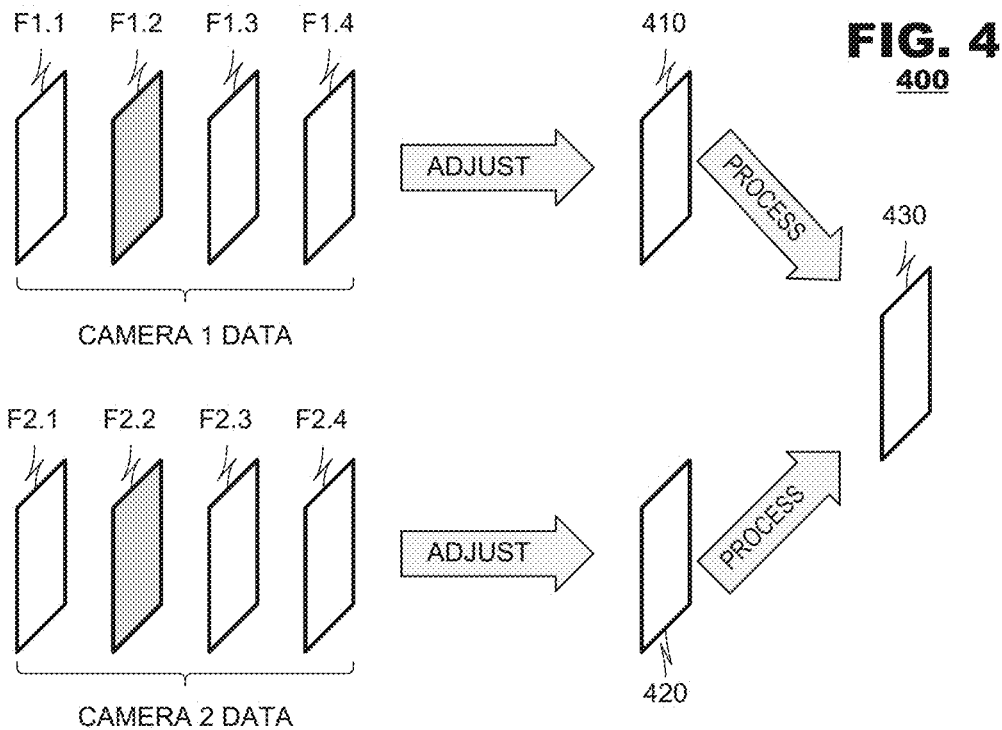
FIG. 4 illustrates application of the method of FIG. 3 to an exemplary set of image data.

FIG. 4 illustrates application of the method 300 of FIG. 3 to the exemplary frame sequence of FIG. 2. As indicated, upon analysis of the frames F1.1-F1.N and F2.1-F2.N, one frame pair F1.2, F2.2 may be designated as the reference frame pair. Content of the other images in each sequence may be used to adjust image content of the reference frame pair. Thus, content of frames F1.1 and F1.3-F1.N may be used to adjust frame F1.2, yielding a first adjusted frame 410. Similarly, content of frame F2.1 and F2.3-F2.N may be used to adjust frame F2.2, yielding a second adjusted frame 420. The adjusted frames 410, 420 may be merged, yielding a final frame 430.

Image adjustment also may be performed in a variety of ways. In one embodiment, content of each frame in a reference pair may be denoised using content of other frames output by the same camera. Returning to FIG. 2, if frame pair P3 were selected as a reference frame pair, content of frame F1.3 may be adjusted based on content of some of the other frames F1.1, F1.2, and/or F1.N from camera 1 and content of frame F2.3 may be adjusted based on content of some of the other frames F2.1, F2.2, and/or F2.N from camera 2. For example, content of frames F1.1, F1.2, and/or F1.N may be compared to content of frame F1.3 to identify content of frame F1.3 that likely is noise and remove it, or to select parameters of denoising filters that are to be applied to frame F1.3. In one embodiment, for example, motion estimation analyses may be applied to a sequence of frame F1.3 to estimate spatial region(s) of the frame that have high motion content and region(s) that have low motion content. Similarly, spatial complexity estimates may be performed on regions identified in the frames F1.1-F1.N. Parameters may be selected for denoising filters based on one or more of the region-based motion and/or complexity estimates and a denoising filter may be applied to the region(s) of frame F1.3. Similar processes may be applied to frame F2.3 from the reference frame pair P3, using other frames F2.1, F2.2, and/or F2.N for analyses. In application, it is not necessary all frames F2.1, F2.2, and/or F2.N from a given camera (camera 2) be used to select image adjustments to be applied to a frame F2.3; some frames (e.g., frame F2.N) may be disqualified from use based on their exposure times or if they are estimated to have low image quality themselves.

In another embodiment, image adjustment may be performed as upsampling, which may increase resolution of a given frame. For example, resolution of frame F1.3 may be increased using content from frames F1.1, F1.2, and/or F1.N from camera 1.

Image processing of a reference frame pair P3 may be performed in a variety of ways. In a first embodiment, the frames F1.3, F2.3 of the pair P3 may be fused together to form a single composite image. Where the two frames F1.3, F2.3 have fields of view that overlap only partially, image fusing may cause a single image to be created from a merger of the two fields of view. In some applications, the two frames F1.3, F2.3 may have overlapping fields of view (e.g. a view of one frame F1.3 may be contained entirely within the field of view of a second frame F2.3 but have higher resolution than the second frame F2.3), in which case image fusing may cause a single image to be created from a merger of the two fields of view at the higher resolution using upsampling of low resolution portions of the second frame F2.3 where frame F1.3 does not provide image content.

Image fusion may be performed according to any of a number of techniques. Typically, fusion involves a registration process involving a comparison among image data between the denoised reference frames 410, 420 to identify correspondence between image content of the frames 410, 420. Thereafter, a warp process may be applied to one of the frames, to align the corresponding content of each frame with each other. Thereafter, content of the frames may be merged together. Merger of the frames may occur according to transform domain fusion techniques and/or spatial-domain fusion techniques. Exemplary transform domain fusion techniques include Laplacian pyramid based techniques, curvelet transform based techniques, discrete wavelet transform based techniques, and the like. Exemplary spatial domain transform techniques include weighted averaging, Brovey method and principal component analysis techniques. A final frame 430 may be output from merger of the frames.

In another embodiment, image processing may compare content of the two frames to develop analytical information. For example, content of the frames F1.3, F2.3 of the reference frame pair P3 may be compared to generate a disparity map, which may form the basis for further analytical processes such as depth information. In this embodiment, disparity map data may be output in conjunction with one of the frames (say frame F1.3) as a composite image.

Figure 5:
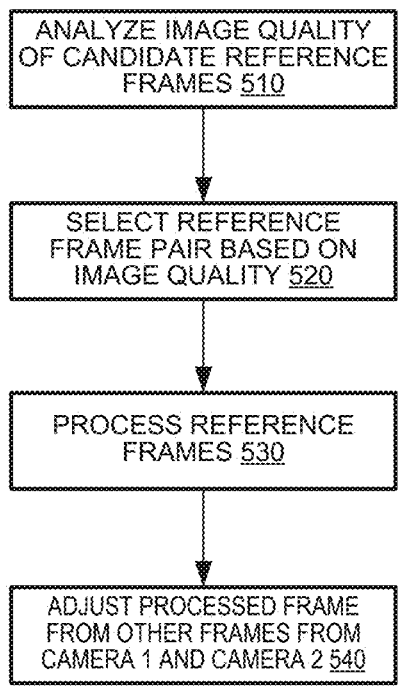
FIG. 5 illustrates a method according to an embodiment of the present disclosure.

In another embodiment, an image processor may perform image processing operations on frame data output from a pair of cameras to derive an aggregate image having improved image quality as compared to the images output from either of the cameras by themselves. FIG. 5 illustrates a method 500 that may be performed by an image processor according to the embodiment.

The method 500 may assess image quality of frames output from the cameras (box 510) and, based on the image quality, designate a pair of the frames to serve as a reference frame pair (box 520). Thus, one frame from the first camera (say, frame F1.2 in FIG. 2) and a counterpart frame F2.2 from the second camera will be designated as a reference frame pair. The method 300 may process the reference frames to form a composite frame (box 530) and may adjust the composite frame using other frames F1.1, F1.3-F1.N and/or F2.1, F2.3-F2.N output from the cameras 1 and 2.

The image quality assessment techniques described hereinabove in connection with FIG. 3 also may find application with the embodiment of FIG. 5.

Figure 6:
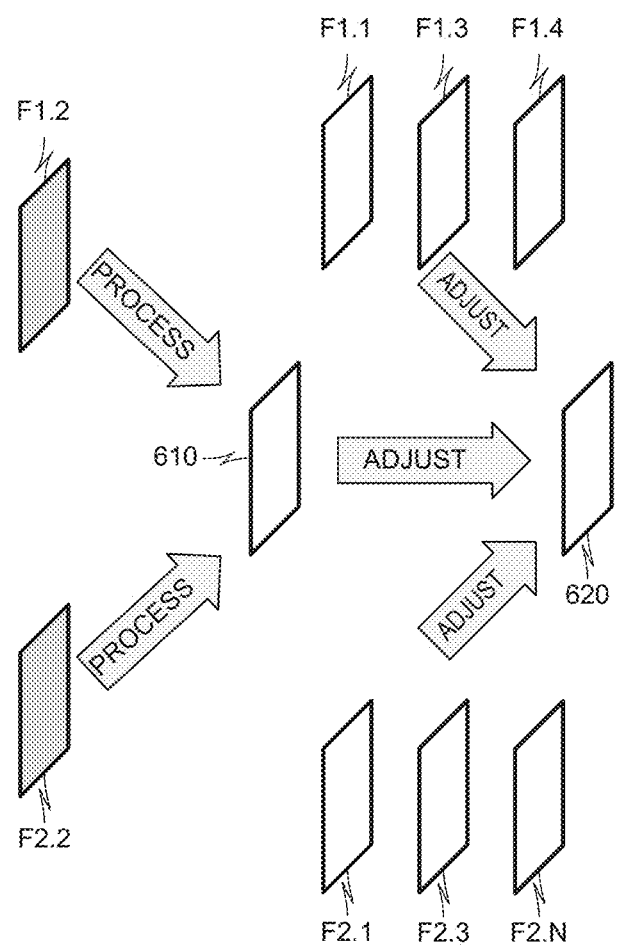
FIG. 6 illustrates application of the method of FIG. 5 to an exemplary set of image data.

FIG. 6 illustrates application of the method 500 of FIG. 5 to the exemplary frame sequence of FIG. 2. As indicated, upon analysis of the frames F1.1-F1.N and F2.1-F2.N, one frame pair F1.2, F2.2 may be designated as the reference frame pair. The reference frames F1.2, F2.2 may be processed, yielding a composite image 610. Content of the other images in each sequence may be used to adjust image content of the composite image 610, yielding a final frame 620.

Image processing may be performed in a variety of ways. In a first embodiment, the frames F1.2, F2.2 of the pair P3 may be fused together to form a single composite image. Where the two frames F1.2, F2.2 have fields of view that overlap only partially, image fusing may cause a single image to be created from a merger of the two fields of view. In some applications, the two frames F1.2, F2.2 may have overlapping fields of view (e.g. a view of one frame F1.2 may be contained entirely within the field of view of a second frame F2.2 but have higher resolution than the second frame F2.2), in which case image fusing may cause a single image to be created from a merger of the two fields of view at the higher resolution using upsampling of low resolution portions of the second frame F2.2 where frame F1.2 does not provide image content.

Image fusion may be performed according to any of a number of techniques. Typically, fusion involves a registration process involving a comparison among image data between the reference frames F1.2, F2.2 to identify correspondence between image content of the frames F1.2, F2.2. Thereafter, a warp process may be applied to one of the frames, to align the corresponding content of each frame with each other. Thereafter, content of the frames may be merged together. Merger of the frames may occur according to transform domain fusion techniques and/or spatial-domain fusion techniques. Exemplary transform domain fusion techniques include Laplacian pyramid based techniques, curvelet transform based techniques, discrete wavelet transform based techniques, and the like. Exemplary spatial domain transform techniques include weighted averaging, Brovey method and principal component analysis techniques. A final frame 610 may be output from merger of the frames.

In another embodiment, image processing may compare content of the two frames to develop analytical information. For example, content of the frames F1.2, F2.2 of the reference frame pair P3 may be compared to generate a disparity map, which may form the basis for further analytical processes such as depth information. In this embodiment, disparity map data may be output in conjunction with one of the frames (say frame F1.2) as a composite image.

Image adjustment 540 also may be performed in a variety of ways. In one embodiment, content of each frame in a reference pair may be denoised using content of other frames output by the same camera. Thus, content of frame F1.2 may be adjusted based on content of some of the other frames F1.1, F1.3, and/or F1.N from camera 1 and content of frame F2.2 may be adjusted based on content of some of the other frames F2.1, F2.3, and/or F2.N from camera 2. For example, content of frames F1.1, F1.3, and/or F1.N may be compared to content of frame F1.2 to identify content of frame F1.2 that likely is noise and remove it, or to select parameters of denoising filters that are to be applied to frame F1.2. In one embodiment, for example, motion estimation analyses may be applied to a sequence of frame F1.2 to estimate spatial region(s) of the frame that have high motion content and region(s) that have low motion content. Similarly, spatial complexity estimates may be performed on regions identified in the frames F1.1-F1.N. Parameters may be selected for denoising filters based on one or more of the region-based motion and/or complexity estimates and a denoising filter may be applied to the region(s) of frame F1.2. Similar processes may be applied to frame F2.2 from the reference frame pair, using other frames F2.1, F2.3, and/or F2.N for analyses. In application, it is not necessary all frames F2.1, F2.3, and/or F2.N from a given camera (camera 2) be used to select image adjustments to be applied to a frame F2.2; some frames (e.g., frame F2.N) may be disqualified from use based on their exposure times or if they are estimated to have low image quality themselves.

In another embodiment, image adjustment may be performed as upsampling, which may increase resolution of a given frame. For example, resolution of frame F1.2 may be increased using content from frames F1.1, F1.3, and/or F1.N from camera 1.

Image processing of a reference frame pair may be performed in a variety of ways. In a first embodiment, the frames F1.2, F2.2 of the pair may be fused together to form a single composite image. Where the two frames F1.2, F2.2 have fields of view that overlap only partially, image fusing may cause a single image to be created from a merger of the two fields of view. In some applications, the two frames F1.2, F2.2 may have overlapping fields of view (e.g. a view of one frame F1.2 may be contained entirely within the field of view of a second frame F2.2 but have higher resolution than the second frame F2.2), in which case image fusing may cause a single image to be created from a merger of the two fields of view at the higher resolution using upsampling of low resolution portions of the second frame F2.2 where frame F1.2 does not provide image content.

FIG. 7 illustrates a fusion unit 700 according to an embodiment of the present disclosure. The fusion unit may include a plurality of frequency decomposition units 710-712, 720-722, . . . , 730-732, a plurality of layer fusion units 740-746 and a merger unit 750. The frequency decomposition units 710-712, 720-722, . . . , 730-734 may be arranged as a plurality of layers, each layer generating filtered versions of the data input to it. A first chain of frequency decomposition units 710, 720, . . . , 730 may be provided to filter data of a first image (called the "primary" image, for convenience) and a second chain of frequency decomposition units 712, 722, . . . , 732 may be provided to filter image data of a second image (called the "secondary" image, again for convenience.). The primary image data may correspond one of the images output from the image registration process, for example, either the warped image or the non-warped image, and the secondary image data may correspond to the other of the images from image registration process. Each layer of the frequency decomposition units 710-712, 720-722, . . . , 730-732 may have a layer fusion unit 740, 742, 744, . . . 746 associated with it.

The layer fusion units 740-746 may output image data of their associated layers. Thus, the layer fusion unit 740 may be associated with the highest frequency data from the primary image and the warped secondary image (no frequency decomposition), a second layer fusion unit 742 may be associated with a first layer of frequency decomposition, and a third layer fusion unit 744 may be associated with a second layer of frequency decomposition. A final layer fusion unit 746 may be associated with a final layer of frequency decomposition. Each layer fusion unit 740, 742, 744, . . . 746 may receive the primary image layer data, the secondary image layer data and the weight layer data of its respective layer. Output data from the layer fusion units 740-746 may be input to the merger unit 750.

Each layer fusion unit 740, 742, 744, . . . 746 may determine whether to fuse the primary image layer data and the secondary image layer data based on a degree of similarity between the primary image layer data and the secondary image layer data at each pixel location. If co-located pixels from the primary image layer data and the secondary image layer data have similar values, the layer fusion unit (say, unit 742) may fuse the pixel values. If the co-located pixels do not have similar values, the layer fusion unit 742 may not fuse them but rather output a pixel value taken from the primary image layer data.

The merger unit 750 may combine the data output from the layer fusion units 740-746 into a fused image. The merger unit 750 may scale the image data of the various layers to a common resolution, then add the pixel values at each location. Alternatively, the merger unit 750 may weight the layers' data further according to a hierarchy among the layers. For example, in applications where secondary image data is expected to have higher resolution than primary image data, correspondingly higher weights may be assigned to output data from layer fusion units 740-742 associated with higher frequency layers as compared to layer fusion units 744-746 associated with lower frequency layers. In application, system designers may tailor individual weights to fit their application needs.

FIG. 7 illustrates structure of an exemplary layer fusion unit 760 according to an embodiment of the present disclosure. The layer fusion unit 760 may include an adder 462, a selector 764 and a comparison unit 766. The adder 762 may generate pixel-wise sums of the image data input to from the primary and secondary images. In this manner, the adder 762 may generate fused image data at each pixel location.

The selector 764 may have inputs connected to the adder 762 and to the primary image data that is input to the layer fusion unit 760. A control input may be connected to the comparison unit 766. The selector 764 may receive control signals from the comparison unit 766 that, for each pixel, cause the selector 764 to output either a pixel value received from the adder 762 or the pixel value in the primary image layer data. The selector's output may be output from the layer fusion unit 760.

As indicated, the layer fusion unit 760 may determine whether to fuse the primary image layer data and the secondary image layer data based on a degree of similarity between the primary image layer data and the secondary image layer data at each pixel location. The comparison unit 766 may determine a level of similarity between pixels in the primary and the secondary image level data. In an embodiment, the comparison unit 766 may make its determination based on a color difference and/or a local high frequency difference (e.g. gradient difference) between the pixel signals. If these differences are lower than a predetermined threshold then the corresponding pixels are considered similar and the comparison unit 766 causes the adder's output to be output via the selector 764 (the image data is fused at the pixel location).

In an embodiment, the comparison threshold may be set based on an estimate of a local noise level. The noise level may be set, for example, based properties of the cameras 120, 130 (FIG. 1) or based on properties of the image capture event (e.g., scene brightness). In an embodiment, the threshold may be derived from a test protocol involving multiple test images captured with each camera. Different thresholds may be set for different pixel locations, and they may be stored in a lookup table (not shown).

Figure 8:
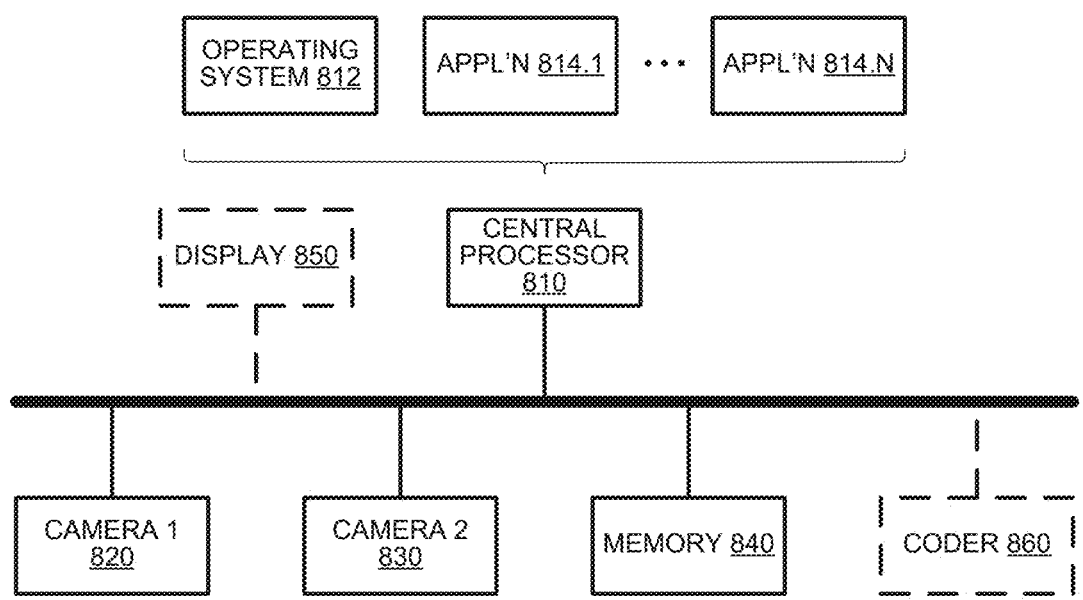
FIG. 8 illustrates an exemplary computer system suitable for use with embodiments of the present disclosure.

In another embodiment, the image processing techniques described herein may be performed by a central processor of a computer system. FIG. 8 illustrates an exemplary computer system 800 that may perform such techniques. The computer system 800 may include a central processor 810, a pair of cameras 820, 830 and a memory 840 provided in communication with one another. The cameras 820, 830 may perform image capture according to the techniques described hereinabove and may store captured image data in the memory 840. Optionally, the device also may include a display 850 and a coder 860 as desired.

The central processor 810 may read and execute various program instructions stored in the memory 840 that define an operating system 812 of the system 800 and various applications 814.1-814.N. The program instructions may perform image processing according to the techniques described herein. As it executes those program instructions, the central processor 810 may read from the memory 840, image data created by the cameras 820, 830 and it may perform quality assessment operations, frame selection, denoising operations, and image fusion operations as described hereinabove.

As indicated, the memory 840 may store program instructions that, when executed, cause the processor to perform the image fusion techniques described hereinabove. The memory 840 may store the program instructions on electrical-, magnetic- and/or optically-based storage media.

The image processor 120 (FIG. 1) and the central processor 810 (FIG. 8) may be provided in a variety of implementations. They can be embodied in integrated circuits, such as application specific integrated circuits, field programmable gate arrays, digital signal processors and/or general purpose processors. The image processor 120 and/or the central processor 810 each may be provided either as a single processor integrated circuit or as a distributed system of processor integrated circuits. The image processor 120 and the central processor 810 may be provided as a common processor integrated circuit, if convenient.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method, comprising:
    assessing quality of a sequence of paired images output by a plurality of cameras, a first image in each pair output by a first camera and a second image in each pair output by a second camera;
    selecting a camera of the plurality of cameras based on a parameter of the camera;
    selecting a frame pair based on the assessed quality of frames from the selected camera;
    performing image correction on a first image from the selected pair using other images output from the first image's associated camera; and
    merging the corrected first image from the selected pair and a second image from the selected pair into a composite image.

2. The method of claim 1, further comprising, prior to the merging, performing image correction on the second image in the selected pair using other images output from the second image's associated camera.

3. The method of claim 1, wherein images output from one of the cameras are generated according to variable exposure times.

4. The method of claim 1, wherein images output from one of the cameras are generated according to a common exposure time.

5. The method of claim 1, wherein images output from one of the cameras are generated according to a predetermined exposure cadence.

6. The method of claim 1, wherein, when one of the images is generated according to an exposure time that exceeds a predetermined duration, the one image is disqualified from being selected.

7. The method of claim 1, wherein the quality assessment includes blur estimation.

8. The method of claim 1, wherein the quality assessment includes sharpness estimation.

9. The method of claim 1, wherein the quality assessment includes brightness estimation.

10. The method of claim 1, wherein the quality assessment is derived from motion sensor data associated with image capture events of the cameras.

11. The method of claim 1, wherein the merging comprises fusing content of the frames of the selected frame pair together.

12. The method of claim 1, wherein the merging comprises comparing content of the frames of the selected frame pair.

13. The method of claim 1, wherein the image correction is a denoising technique comprising:
    comparing the content of the first image in the selected pair with the other images output from the first image's associated camera to identify content in the first image in the selected pair that is likely noise; and
    removing the noise in the identified content.

14. The method of claim 1, wherein the image correction is a denoising technique comprising:
    comparing the content of the first image in the selected pair with the other images output from the first image's associated camera to select parameters of a denoising filter; and
    applying the denoising filter with the selected parameters to the first image in the selected pair.

15. The method of claim 1, wherein the image correction is a denoising technique comprising:
    upsampling the first frame by increasing the resolution of the first frame using content from the other images output from the first image's associated camera.

16. The method of claim 1, wherein the operational parameter is based on image stabilization assessments of the paired images.

17. The method of claim 16, wherein the first camera and second camera are mounted within the same device, and wherein the image stabilization assessments of the paired images are derived from motion sensor data for the device and associated with each pair of the images.

18. The method of claim 1,
    wherein the selecting of a frame pair is based on the assessed quality of only the images output by the selected camera and not based on the image output by the non-selected camera.

19. The method of claim 1, wherein the selecting of the frame pair is based on the similarity in the parameter between first camera and the second camera used when capturing the frame pair.

20. The method of claim 1, wherein the selecting of the frame pair is based on the similarity in an exposure time between first camera and the second camera used when capturing the frame pair.

21. The method of claim 1, wherein the parameter is a level of zoom.

22. The method of claim 1, wherein the parameter is an operator control.

23. The method of claim 1, wherein the selecting of a frame pair is based on the assessed quality of the images output by both the first and second cameras.

24. Apparatus, comprising:
    a plurality of cameras having synchronized image capture operations;
    an image processor to:
        assess quality of a sequence of paired images output by the cameras;
        select a camera of the plurality of cameras based on a parameter of the selected camera;
        select a frame pair based on the assessed quality of the frames from the selected camera;
        perform image correction on a first image in the selected pair using other images output from the first image's associated camera; and
        merge the corrected first image from the selected pair and a second image from the selected pair into a composite image.

25. The apparatus of claim 24, wherein, prior to the merging, the image processor performs image correction on the second image in the selected pair using other images output from the second image's associated camera.

26. The apparatus of claim 24, wherein at least one of the cameras operate according to a variable exposure cadence.

27. The apparatus of claim 24, wherein at least one of the cameras operate according to a common exposure time.

28. The apparatus of claim 24, wherein, when one of the images is generated according to an exposure time that exceeds a predetermined duration, the image processor disqualifies the one image from being selected.

29. The apparatus of claim 24, wherein the quality assessment includes blur estimation.

30. The apparatus of claim 24, wherein the quality assessment includes sharpness estimation.

31. The apparatus of claim 24, wherein the quality assessment includes brightness estimation.

32. The apparatus of claim 24, further comprising a motion sensor, wherein the quality assessment applies motion sensor data associated with image capture events of the cameras.

33. The apparatus of claim 24, further comprising an ambient light sensor, wherein the quality assessment applies light sensor data associated with image capture events of the cameras.

34. Non-transitory computer readable medium storing program instructions that, when executed by a processing device, cause the device to:

assess quality of a sequence of image pairs output by synchronized cameras, a first image in each pair output by a first camera and a second image in each pair output by a second camera;

select a camera of the plurality of cameras based on a parameter of the selected camera;

select a frame pair based on the assessed quality of frames from the selected camera;

perform image correction on the first image in the selected pair using other images output from the first image's associated camera; and merge the corrected first image from the selected pair and a second image from the selected pair into a composite image.

35. The medium of claim 34, wherein the program instructions further cause the processing device to, prior to the merging, perform image correction on the second image in the selected pair using other images output from the second image's associated camera.

* * * * *